US012224117B2

(12) United States Patent
Fusaro

(10) Patent No.: US 12,224,117 B2
(45) Date of Patent: Feb. 11, 2025

(54) TEST BENCH FOR A BULB OF A CONTACTOR, ASSOCIATED TEST ASSEMBLY AND USE OF SUCH A TEST BENCH

(71) Applicant: Schneider Electric Industries SAS, Rueil Malmaison (FR)

(72) Inventor: Sylvain Fusaro, Brie et Angonnes (FR)

(73) Assignee: Schneider Electric Industries SAS, Rueil Malmaison (FR)

( * ) Notice: Subject to any disclaimer, the term of this patent is extended or adjusted under 35 U.S.C. 154(b) by 339 days.

(21) Appl. No.: 17/894,237

(22) Filed: Aug. 24, 2022

(65) Prior Publication Data

US 2023/0062316 A1 Mar. 2, 2023

(30) Foreign Application Priority Data

Sep. 2, 2021 (FR) .................................. FR2109180

(51) Int. Cl.
*H01F 7/18* (2006.01)

(52) U.S. Cl.
CPC ... *H01F 7/1844* (2013.01); *H01F 2007/1861* (2013.01)

(58) Field of Classification Search
CPC . H01F 7/1844; H01F 2007/1861; H01H 1/20; H01H 9/34; H01H 2300/052; H01H 3/02; H01H 11/0062
USPC .......................................................... 335/185
See application file for complete search history.

(56) References Cited

FOREIGN PATENT DOCUMENTS

| | | |
|---|---|---|
| CN | 105938781 B | 11/2017 |
| CN | 107658157 B | 1/2021 |
| FR | 1605244 A | 9/1973 |

OTHER PUBLICATIONS

French Search Report and Written Opinion dated Apr. 27, 2022 for corresponding French Patent Application No. FR2109180, 6 pages.

*Primary Examiner* — Shawki S Ismail
*Assistant Examiner* — Lisa N Homza
(74) *Attorney, Agent, or Firm* — Troutman Pepper Locke

(57) ABSTRACT

A test bench for a contactor bulb includes: a frame, configured to fix the bulb therein, and an actuation device, borne by the frame and including an output shaft, centred on a longitudinal axis and translationally movable with respect to the frame parallel to the longitudinal axis between a front position and a rear position, the output shaft being configured to be connected to an actuation rod of the bulb. The actuation device is a moving magnet electromagnetic actuator.

12 Claims, 6 Drawing Sheets

TEST BENCH FOR A BULB OF A CONTACTOR, ASSOCIATED TEST ASSEMBLY AND USE OF SUCH A TEST BENCH

TECHNICAL FIELD

The present invention relates to a test bench for testing a bulb of a contactor, a test assembly comprising such a test bench, as well as the use of such a test bench.

BACKGROUND

A contactor is a switching device, which is interposed between a power supply line and an electrical load and which is used to control the power supply to this load, for example, an electric motor. For each phase of the power supply line, the contactor comprises two fixed contacts and one movable contact, with the movements of the movable contact being controlled by an actuator. The fixed and movable contacts are preferably accommodated in an isolated enclosure, also called "bulb". In general, the actuator is an electromagnetic actuator, which comprises a coil and a central metal rod, which is connected to the movable contact and is moved when an excitation current flows through the coil.

Depending on the application and on the power of the considered electric motors, several categories, or sizes, of contactors are provided. Within each category of contactors, the bulbs and electromagnetic actuators naturally have mutually compatible features, particularly in terms of mechanical forces, speed and amplitude of actuation, etc.

When developing new elements of a contactor, in particular when developing a new bulb, either for its structure and/or for the materials used, these new elements are subjected to endurance tests, which can reach up to several million closing/opening cycles.

In order to comply with the control features of a bulb of a particular category, in particular the mechanical forces, the speed, etc., this bulb is usually tested by means of an electromagnetic actuator belonging to the same category, typically a standard electromagnetic actuator, most often originating from a product already on the market.

However, as an order of magnitude of the duration of a closing/opening cycle of a standard electromagnetic actuator is of the order of three seconds, endurance testing involving one million cycles takes almost a month to complete, which is particularly impractical.

SUMMARY

The invention more specifically seeks to overcome these issues, by proposing a test bench for a contactor bulb that is compatible with several categories of bulbs and is faster.

To this end, the invention relates to a test bench for a contactor bulb, the test bench comprising:

- a frame, configured to fix the bulb therein; and
- an actuation device, borne by the frame and comprising an output shaft, centred on a longitudinal axis and translationally movable with respect to the frame parallel to the longitudinal axis between a front position and a rear position, the output shaft being configured to be connected to an actuation rod of the bulb.

According to the invention, the actuation device is a moving magnet electromagnetic actuator.

By virtue of the invention, the moving magnet electromagnetic actuator allows a sufficient force to be generated to control the opening and closing of the bulbs, while being fast, repeatable and reliable: endurance tests are quicker to carry out than with a conventionally used electromagnetic actuator. On the other hand, the moving magnet electromagnetic actuator generates a force and a speed on the output shaft that are adjustable: the test bench according to the invention is thus compatible with bulbs belonging to contactors of various categories, which is practical and economical.

According to advantageous but non-compulsory aspects of the invention, such a test bench can incorporate one or more of the following features taken individually or according to any technically permissible combination:

- The actuation device comprises:
  - a coil, which extends along the longitudinal axis;
  - a cage, disposed radially to the longitudinal axis around the coil, translationally guided with respect to the coil parallel to the longitudinal axis and rigidly connected to the output shaft; and
  - permanent magnets, borne by the cage and arranged around the coil;
- the cage being configured to be translationally moved with respect to the coil along the longitudinal axis when the coil is energized by an electrical power signal.
- The test bench further comprises a control device, which comprises:
  - an analogue module with an input and an output, the input being configured to receive control instructions sent by a computer, while the output is configured to deliver an analogue control signal for controlling the actuation device as a function of the control instructions; and
  - a control board, comprising a first input, connected to the output of the analogue module, a second input, connected to an electrical power source, and a power output, connected to the coil;
- wherein the control board is configured to combine the analogue control signal with the electrical power source so as to deliver the electrical power signal to the coil.
- The test bench further comprises:
  - a movable stop, mounted on the output shaft; and
  - two fixed stops, rigidly connected to the frame and arranged on either side of the movable stop, so as to limit the movements of the output shaft between the front and rear positions.
- The fixed stops are made of elastomer material.
- The test bench further comprises a position sensor, preferably a laser sensor, configured to measure a position of an end of the output shaft connected to the actuation rod of each bulb.
- The test bench further comprises a force sensor, for example, a piezoelectric sensor, configured to measure a force exerted by the output shaft on the actuation rod of each bulb.

The invention also relates to a test assembly, comprising:

- a test bench as defined above; and
- at least one bulb;
- wherein:
- each bulb is fixed to the frame; and
- the actuation rod of each bulb is connected to the output shaft.

According to another aspect, the invention relates to the use of a test bench as previously defined for testing one or more contactor bulbs, the use comprising the following steps:

- fixing the one or more bulbs to the frame;

connecting the output shaft to the actuation rod of each bulb;

moving the output shaft between its front and rear positions by means of the actuation device as many times as desired, for example, one million times.

This method elicits the same advantages as mentioned above with respect to the test bench of the invention.

BRIEF DESCRIPTION OF THE DRAWINGS

The invention will be better understood, and further advantages thereof will become more clearly apparent in the light of the following description of an embodiment of a test bench for a contactor bulb, a test assembly and the use of such a test bench, in accordance with its principle, provided solely by way of an example and with reference to the appended drawings, in which.

DETAILED DESCRIPTION

Figure 1:
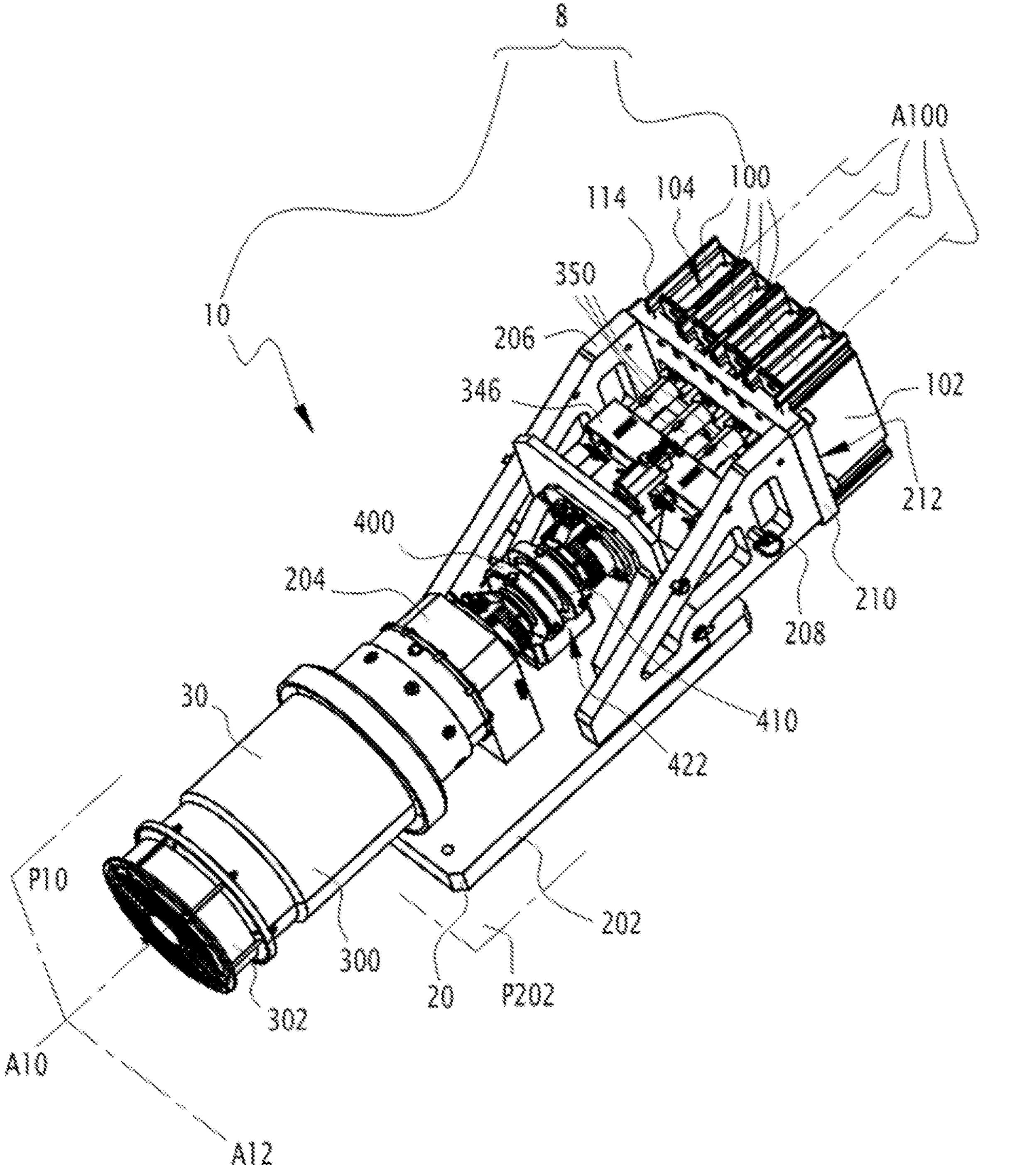
FIG. 1 is a perspective view of a test bench according to the invention, shown in an operating configuration, in which contactor bulbs are mounted on the test bench.

A test assembly 8 according to the invention is shown in FIG. 1. The test assembly 8 comprises a test bench 10, and at least one bulb 100. The test assembly 8 in this case comprises four bulbs 100. A bulb 100 is described hereafter with reference to FIG. 2. The test bench 10 is configured to test the one or more bulbs 100 that are fixed to the test bench 10. The bulbs 100 do not form part of the test bench 10 but are necessary for the normal use thereof, with the purpose of this test bench 10 being to test bulbs 100. Between one and four bulbs 100 in this case can be simultaneously tested on the test bench 10. When several bulbs 100 are tested together, these bulbs 100 are identical to each other. In FIG. 1, the test bench 10 is shown in the operating configuration, with four bulbs 100 fixed to the test bench 10 for testing, for example, for endurance tests.

Figure 2:
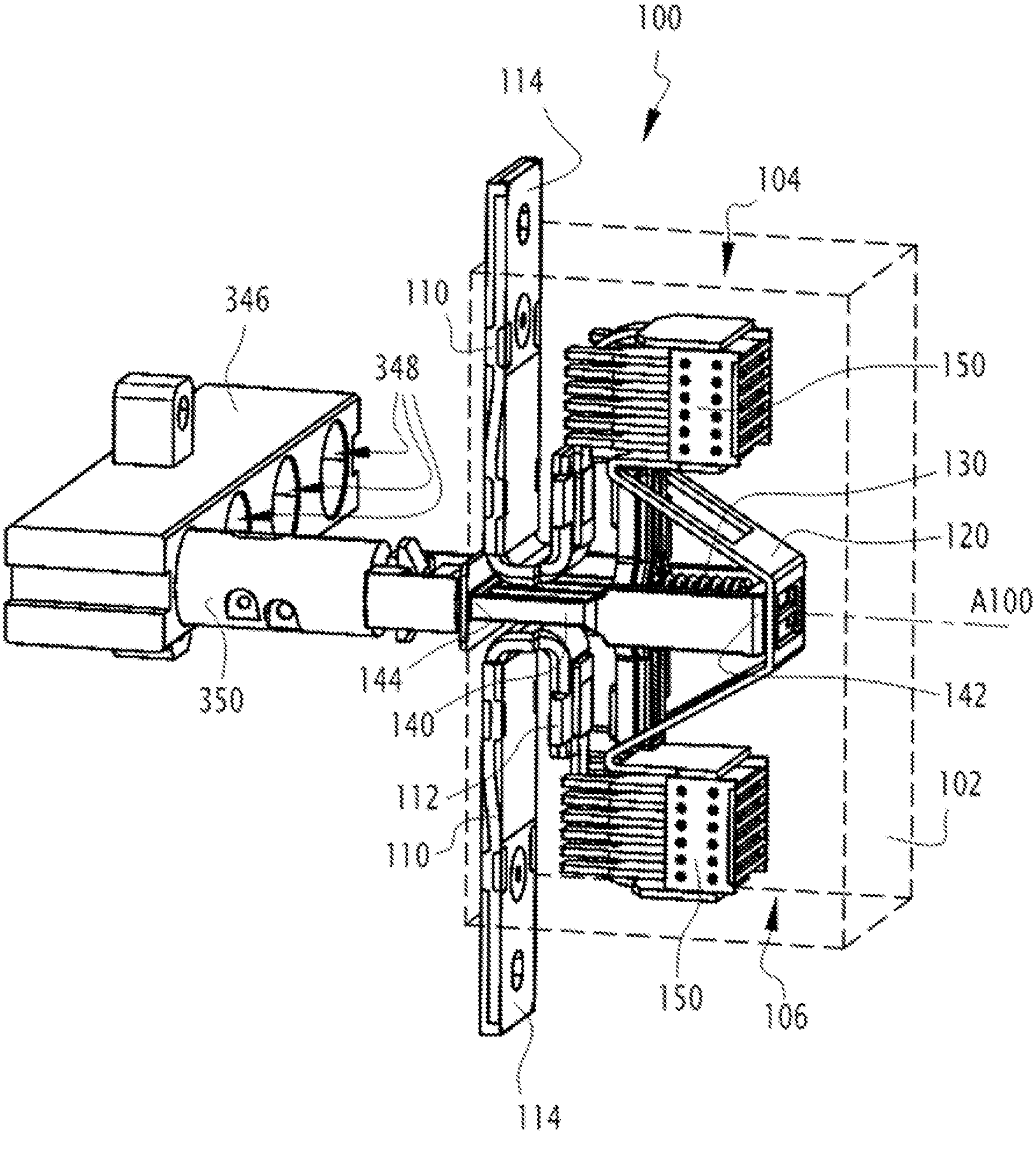
FIG. 2 is a partial perspective view of a bulb of FIG. 1.

The bulb 100 shown in FIG. 2 will be described first, with the structure of this bulb 100 being non-limiting. The bulb 100 comprises an enclosure 102, in this case of substantially parallelepiped shape, with an upper face 104 and an opposite lower face 106. The enclosure 102 is schematically shown by dashed lines and as a transparent view in order to reveal the inside of the bulb 100. The enclosure 102 is made of an electrically isolating material and is generally sealed, hence the name "bulb". The enclosure 102 is generally made of a synthetic polymer material, for example, a thermoset material.

The bulb 100 comprises two fixed contacts 110, which are fixed with respect to the enclosure 102. The fixed contacts 110 are made of metal, for example, copper alloy, and each have a first end 112 and an opposite second end 114. Each first end 112, which in this case is hook shaped, is housed inside the enclosure 102, while each second end 114, which in this case is straight with a through hole, is accessible from outside the enclosure 102. In the illustrated example, one of the two fixed contacts 110 emerges out of the enclosure 102 from the upper face 104, while the other one of the two fixed contacts 110 emerges out of the enclosure 102 from the lower face 106.

The bulb 100 also comprises a movable contact 120, which is accommodated inside the enclosure 102 and which is translationally movable with respect to the enclosure 102 along an actuation axis A100 between a closed position, in which the movable contact 120 is jointly in abutment on each of the two fixed contacts 110, and an open position, in which the movable contact 120 is not in abutment on any of the two fixed contacts 110. The movable contact 120 in this case generally assumes a "Z" (uppercase sigma) shape.

The bulb 100 comprises a spring 130, which is housed in the enclosure 102 and is configured to push the movable contact 120 from its closed position to its open position. The bulb 100 comprises an actuation rod 140, which has an elongated shape extending along the actuation axis A100 and which comprises a captive end 142 and a free end 144, opposite the captive end 142. The captive end 142 is located within the enclosure 102 and is connected to the movable contact 120, while the free end 144 is accessible from outside the enclosure 102. In this case, the free end 144 is located outside the enclosure 102. The actuation rod 140 is configured to move the movable contact 120 between its open and closed positions, against the spring 130.

The bulb 100 in this case comprises two arc chambers 150, configured to dissipate electric arcs that occur when the bulb 100 is used, for example, when the movable contact 120 is moved from its closed position to its open position.

The test bench 10 will now be described with reference to FIG. 1.

The test bench 10 comprises a frame 20, which is configured to be fixed on a support, for example, a workbench. The support is not shown. According to some embodiments, the support comprises a movable frame, for example, mounted on castors, and the control unit of the test bench 10. During endurance tests, the support is considered to be stationary.

The frame 20, which in this case is made of an assembly of machined aluminium parts screwed together, is considered to be fixed and non-deformable. The frame 20 in this case comprises a base 202, a flange 204, two lateral supports 206 and 208, and an interface plate 210.

The base 202 is made of a rectangular plate and extends in a base plane P202. The base plane P202 is horizontal in this case. The description is provided in relation to the orientation of the various elements shown in the drawings, bearing in mind that it actually may be different.

The flange 204 has a substantially parallelepiped shape and is fixed to an upper face of the base 202. The flange 204 has a hole 212 passing through it, centred on a longitudinal axis A10 of the test bench 10. The longitudinal axis A10, which is parallel to the base 202, is horizontal in this case.

The lateral supports 206 and 208 are symmetrically arranged on either side of a longitudinal plane P10 of the test bench 10. The longitudinal plane P10, which in this case is a vertical plane, supports the longitudinal axis A10 and is orthogonal to the base plane P202. The lateral supports 206 and 208 each have a generally triangular shape with recesses and each extend parallel to the longitudinal plane P10. The lateral supports 206 and 208 connect the base 202 to the interface plate 210.

The interface plate 210 is arranged in a plate and extends in a transverse direction of the test bench 10, in other words, orthogonal to the longitudinal axis A10. A transverse axis A12 of the test bench 10 is defined as being an axis orthogonal to the longitudinal axis A10 and parallel to the base plane P202. The transverse axis A12 is therefore horizontal in this case.

The interface plate 210 is configured to accommodate one or more bulbs 100, which are fixed to a front face 212 of the interface plate 210. The "forwards" or "backwards" directions are arbitrarily defined with reference to the drawings, bearing in mind that it actually may be different. The forwards direction in this case is oriented to the right of the figures. When one or more bulbs 100 is/are mounted on the interface plate 210, the actuation axis A100 of each bulb 100 is parallel to the longitudinal axis A10.

Figure 3:
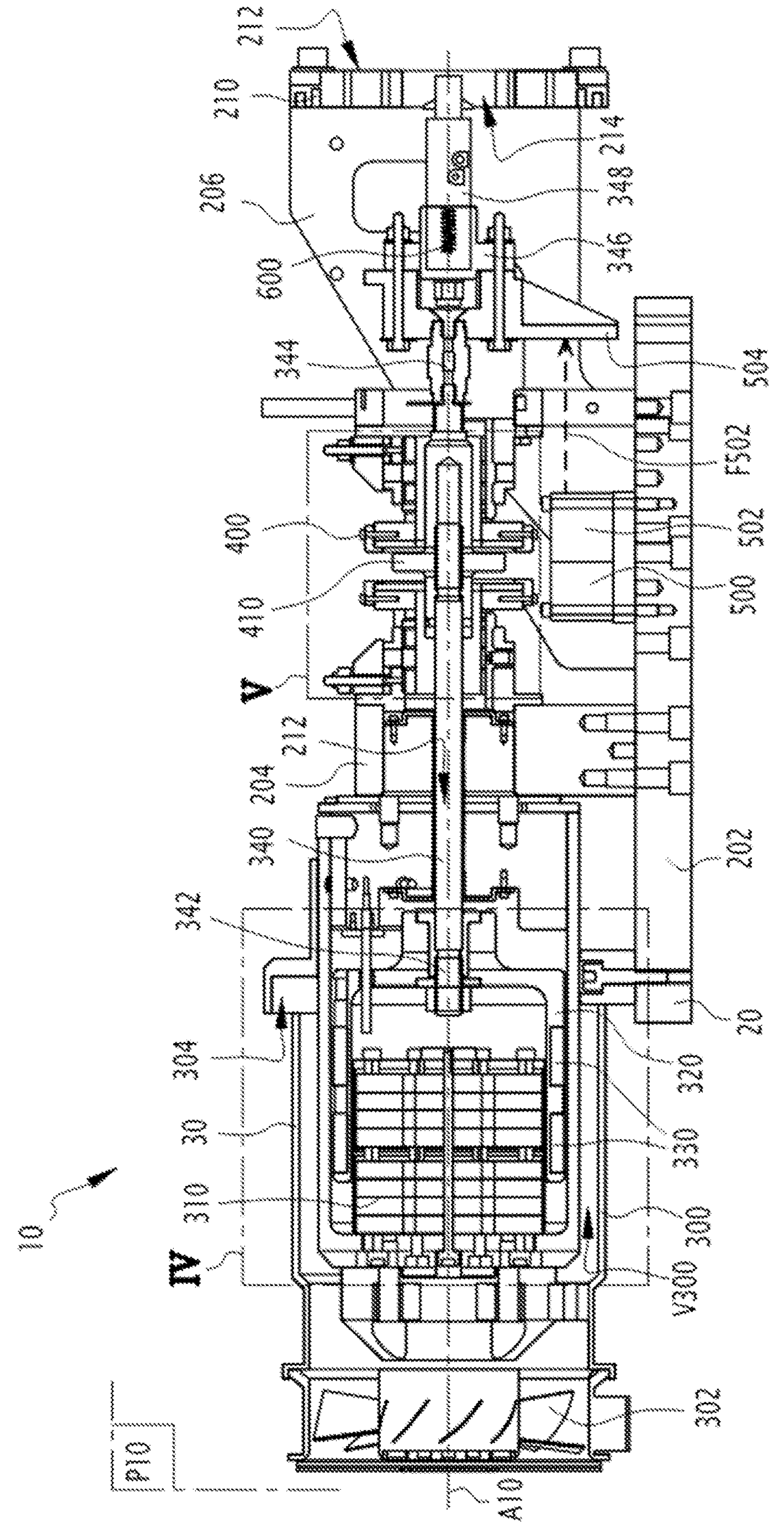
FIG. 3 is a longitudinal section view of the test bench of FIG. 1.

A hole 214, shown in FIG. 3, is arranged through the interface plate 210, with the hole 214 emerging onto the front face 212. The hole 214 is oblong shaped in this case and extends lengthwise parallel to the transverse axis A12.

Figure 4:
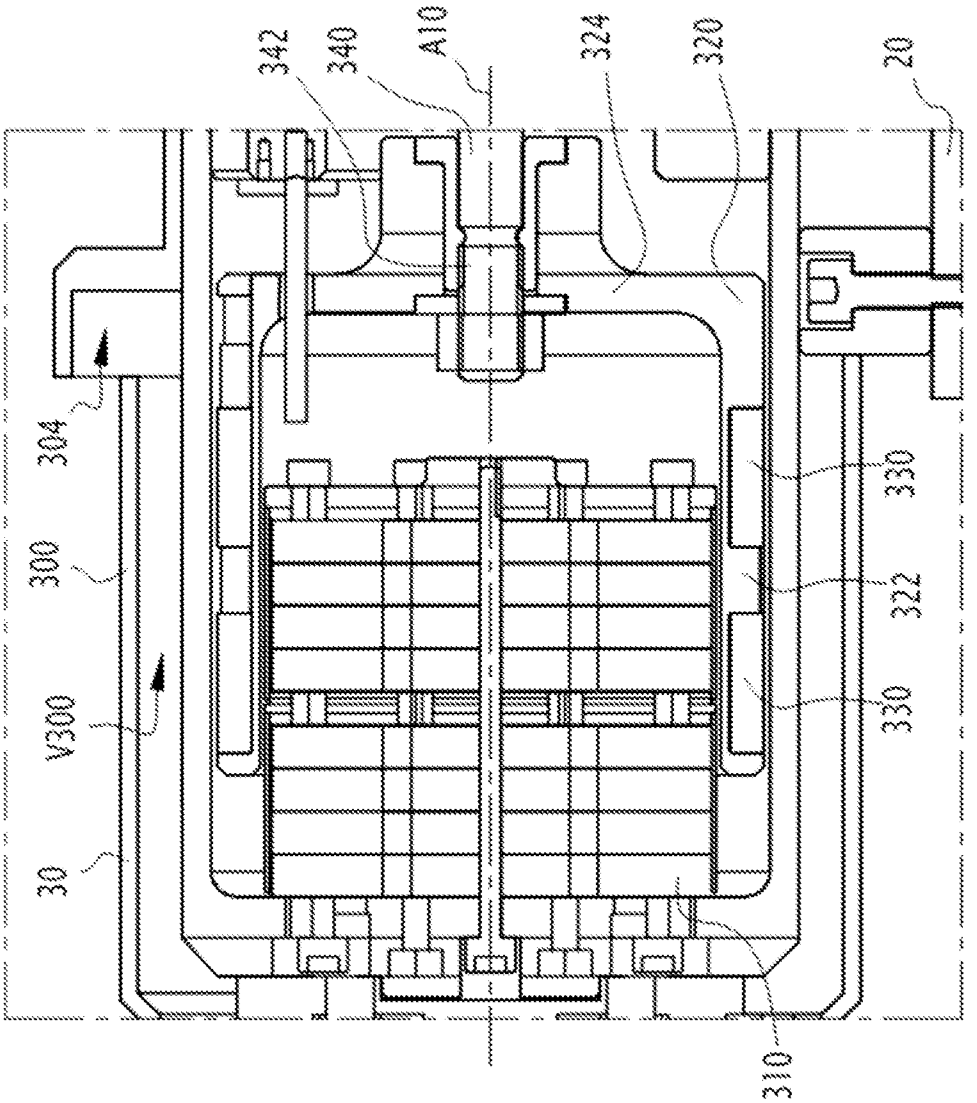
FIG. 4 is a larger scale view of detail IV of FIG. 3.

The test bench 10 comprises an actuation device 30, shown in FIG. 1 and shown in more detail as a cross-section in FIGS. 3 and 4. The actuation device 30 comprises a casing 300, which in this case is of generally cylindrical shape centred on the longitudinal axis A10 and which defines an internal volume V300. The casing 300 is connected by a front end to the flange 204. The actuation device 300 comprises, on a rear end of the casing 300, a fan 302 for cooling the actuation device 30. An air intake 304 is arranged in the casing 300 to allow air to circulate in the casing 300 under the action of the fan 302.

The actuation device 30 comprises a coil 310, which is accommodated in the internal volume V300 and is fixed to the casing 300, in this case on a rear side of the casing 300. In this case, the coil 310 has a generally cylindrical shape centred on the longitudinal axis A10.

The actuation device 30 also comprises a cage 320, which in this case assumes a bell shape with a radial portion 322, which is disposed radially to the longitudinal axis A10 around the coil 310, and an axial portion 324, which is substantially disc-shaped, centred on the longitudinal axis A10 and which in this case is located on a front side of the coil 310. The cage 320 is preferably made of a non-magnetic material. The cage 320 is translationally guided with respect to the coil 310 parallel to the longitudinal axis A10. The actuation device 30 also comprises permanent magnets 330, which are borne by the cage 320 and are arranged around the coil 310. The permanent magnets 330 in this case are shown as a cross-section and are represented by rectangles.

When the coil 310 is energized by an electrical power signal, for example, a power current, the coil 310 generates a magnetic field, which exerts a force on the permanent magnets 330, and therefore on the cage 320. Depending on the direction of the power current, the cage 320 is moved towards the front or the rear of the test bench 10. In other words, the cage 320 is configured to be translationally moved with respect to the coil 310 along the longitudinal axis A10 when the coil 310 is energized by an electrical power signal.

Therefore, the actuation device 30 is a moving magnet electromagnetic actuator. Such a structure is advantageous, as the mechanical friction between the cage 320 and the rest of the actuator 30 is very low, while the generated force can be controlled by the electrical power signal so as to adapt to the size of the bulbs 100 tested on the test bench. In the illustrated example, the actuation device 30 is configured to generate, as selected by the user, a force ranging between 10 N (Newton) and 640 N, with this force in this case being aligned on the longitudinal axis A10. The test bench 10 is thus adapted to test a single small bulb, as well as four large bulbs.

The cage 320 is rigidly connected to an output shaft 340, which is centred on the longitudinal axis A10 and is translationally guided with respect to the frame 20 parallel to the longitudinal axis A10. The assembly of the output shaft 340 and the cage 320 is considered to be rigid and non-deformable. The output shaft 340 therefore reproduces all the forwards or backwards movements of the cage 320.

The actuation device 30 is therefore borne by the frame 20, with the casing 300 being fixed with respect to the frame 20, while the cage 320 and the output shaft 340 are translationally movable with respect to the frame 20 parallel to the longitudinal axis A10.

The output shaft 340 comprises a rear end 342, which in this case is threaded and is connected to the cage 320, and a front end 344, opposite the rear end 342, which is configured to be connected to the actuation rod 140 of each bulb fixed to the interface plate 210.

The front end 344 in this case is connected to an interface flange 346, which is arranged between the front end 344 and each of the actuation rods 140. The interface flange 346 in this case assumes an elongated parallelepiped shape, extending lengthwise along the transverse axis A12. Reception housings 348, in this case four reception housings, shown in FIG. 2, are arranged in the interface flange 346, with each of the reception housings 348 being configured to accommodate a sleeve 350 for fixing to a respective actuation rod 140. The shape of the interface flange 346 is not limiting, and can be changed according to the configuration of the bulbs to be tested.

The assembly of the shaft 340, of the interface flange 346, of each sleeve 350 and of the corresponding actuation rod 140 is considered to be rigid and non-deformable. Movements of the shaft 340, forwards or backwards, are therefore imparted to each actuation rod 140 parallel to the longitudinal axis A10.

Figure 5:
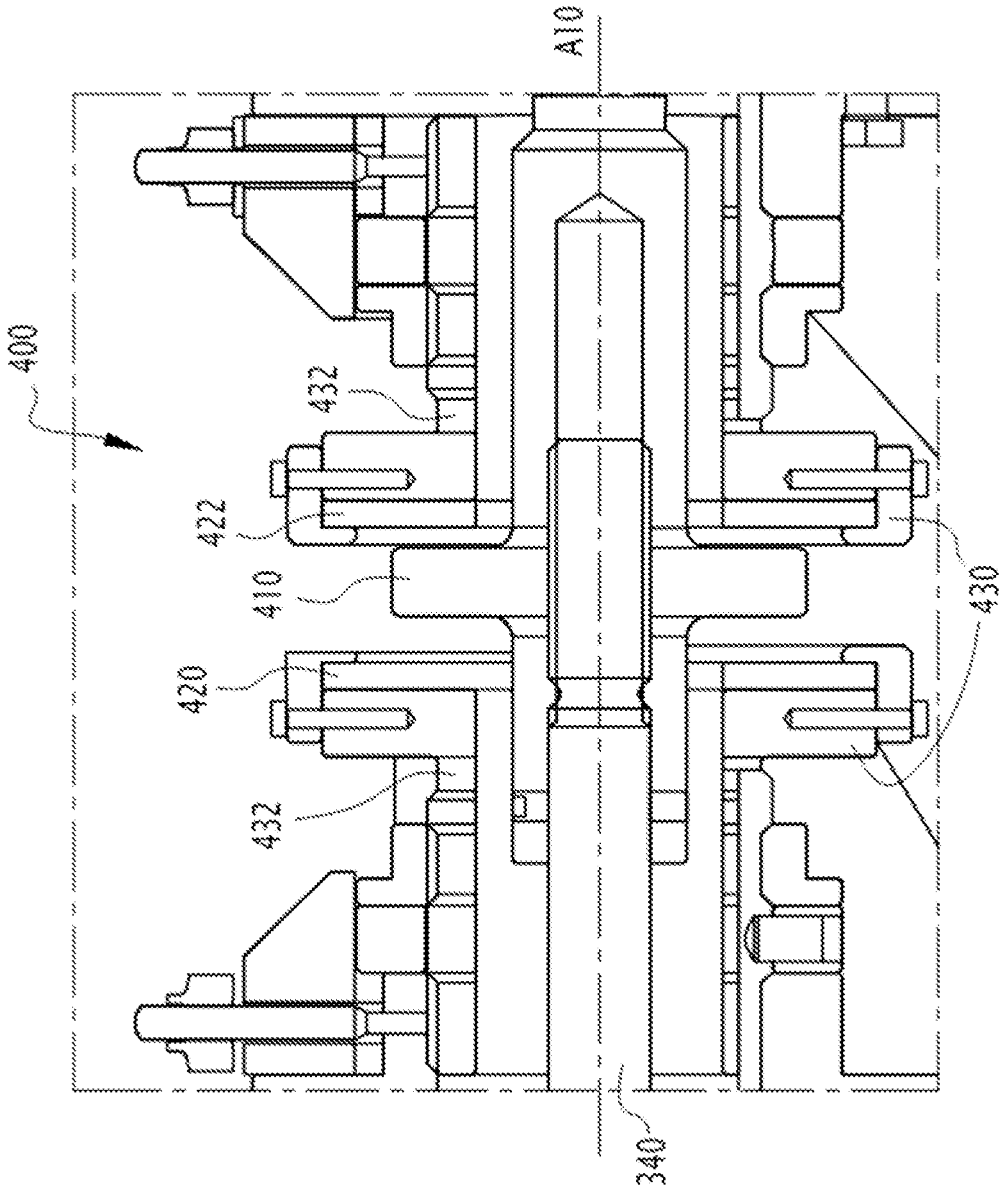
FIG. 5 is a larger scale view of detail V of FIG. 3.

The test bench 10 further comprises a stop device 400, shown in FIGS. 1, 3 and 5. The stop device 400 comprises a movable stop 410, borne by the output shaft 340, and two fixed stops 420 and 422, which are borne by the frame 20.

The movable stop 410 in this case is disc shaped, centred on the longitudinal axis A10. The fixed stops 420 and 422 are arranged on either side of the movable stop 410 along the longitudinal axis A10, so as to limit the movements of the output shaft 340 between the front and rear positions. In the figures, the fixed stop 420 is located on the left of the movable stop 410 and is therefore a rear stop, while the fixed stop 422 located on the right of the movable stop 410 is a front stop.

The fixed stops 420 and 422 in this case each have a ring shape centred on the longitudinal axis A10. Each of the fixed stops 420 or 422 is accommodated in a respective adjustment casing 430, the position of which with respect to the frame 20 along the longitudinal axis A10 is adjustable. In the example, each adjustment casing 430 comprises a tapped portion, which engages with a threaded sleeve 432 connected to the frame 200. Thus, depending on the direction of rotation of each adjustment casing 430 around the longitudinal axis A10, the position of the corresponding fixed stop 420 or 422 is moved forwards or backwards along the longitudinal axis A10. In this way, it is possible to adapt a stroke of the output shaft 340, between the front and rear positions, to the features of the bulbs 100 tested on the test bench 10.

The fixed stops 420 and 422 are preferably made of a synthetic elastomer material, for example, polyurethane. In this way, it is possible to reproduce a rebound effect, which is encountered with conventional electromagnetic actuators when opening or closing the contactor. If necessary, the thickness and/or the stiffness of the fixed stops 420 or 422 is/are changed in order to best reproduce the features of a conventional electromagnetic actuator. Of course, it is also possible to produce the fixed stops 420 and 422 with other materials, in order to evaluate the performance capabilities of these materials during endurance tests similar to the tests to which the bulbs 100 are subjected.

Advantageously, the test bench 10 also comprises a position sensor 500, configured to measure a position of the front end 344 of the output shaft 340, connected to the actuation rod 140 of each bulb 100. The position sensor 500 is preferably a laser sensor 502, which is fixed to the base 202 and aims at a target 504 connected to the interface flange 346. A sighting of the laser sensor 502 is schematically shown by a dashed arrow F502 in FIG. 3. Other methods for measuring position are of course possible, for example, using an electromagnetic sensor, using an optical sensor, etc.

Advantageously, the test bench 10 also comprises a force sensor 600, configured to measure a force exerted by the output shaft 340 on the actuation rod 140 of each bulb 100. In the illustrated example, the force sensor 600 is a piezoelectric sensor, schematically represented by a spring, which is housed in a fixing sleeve 348. Other methods for measuring force are of course possible, for example, using a strain gauge, which is more sensitive to impacts than a piezoelectric sensor, etc.

Figure 6:
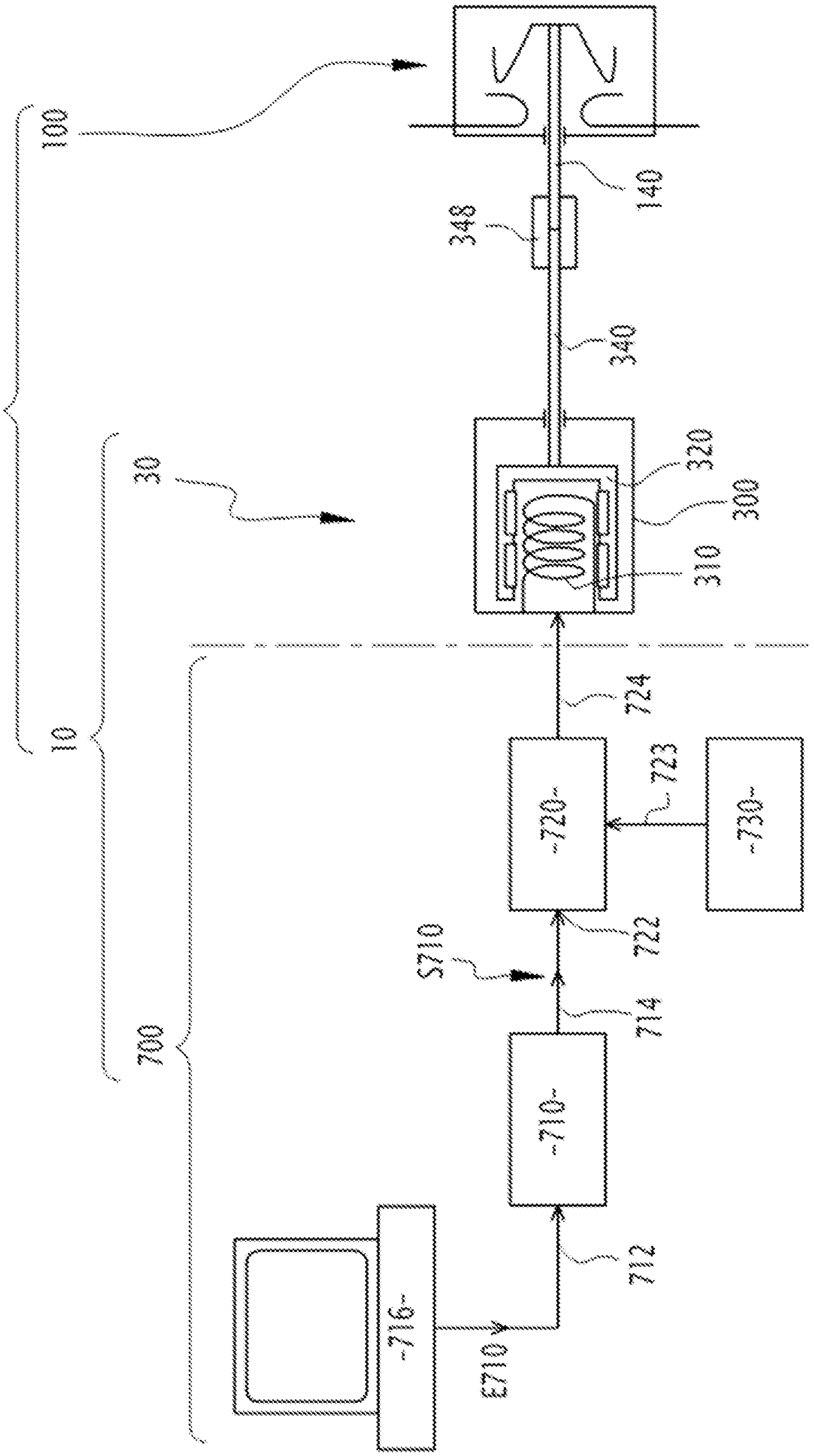
FIG. 6 is a schematic representation of a control device for the test bench of FIG. 1.

The test bench 10 also comprises a control device 700, configured to control the actuation device 30 and schematically shown in FIG. 6. The control device 700 comprises an analogue module 710, with an input 712 and an output 714. The input 712 is configured to receive control instructions E710 sent by a computer 716, while the output 714 is configured to deliver an analogue signal S710 for controlling the actuation device 300 as a function of the control instructions E710.

The control device 700 also comprises a control board 720, the control board comprising a first input 722, connected to the output 714 of the analogue module 710, a second input 723, connected to an electrical power source 730, and a power output 724, connected to the coil 310. The electrical power source 730 in this case is a direct current source, with a voltage varying from 0 to 80 V (Volts) and a maximum current of 30 A (Amperes). The control board 720 is configured to combine the analogue control signal S710 with the electrical power source 730, so as to deliver the electrical power signal 724 to the coil.

When using the test bench 10 to test one or more contactor bulbs 100, the operator fixes the one or more bulbs 100 to the frame 20, more specifically to the interface flange 210, with each output rod 140 facing backwards. The interface flange 210 is then fixed to the rest of the frame 20. Then, the operator connects the output shaft 340 to the actuation rod 140 of each bulb 100, in this case by means of the fixing sleeves 350. Then, the operator starts the tests, i.e., by means of the actuation device 30, the operator moves the output shaft 340 between its front and rear positions as many times as desired, for example, one million times. The start and configuration of the tests, i.e., the number of cycles, the speed and the force of the output shaft 340, etc., are defined, for example, by means of software executed by the computer 716.

By way of a quantitative example, the test bench 10 shown in the figures can perform four complete closing/opening cycles of the bulbs 100 every second, that is approximately twelve times faster than a conventional electromagnetic actuator. An endurance test of one million cycles is thus completed in less than three days, which is particularly fast and convenient.

The aforementioned embodiments and alternative embodiments can be combined together in order to generate new embodiments of the invention.

The invention claimed is:

1. A test bench for a contactor bulb, the test bench comprising:
- a frame, configured to fix the bulb therein; and
- an actuation device, borne by the frame and comprising an output shaft, centred on a longitudinal axis and translationally movable with respect to the frame parallel to the longitudinal axis between a front position and a rear position, the output shaft being configured to be connected to an actuation rod of the bulb,
- wherein the actuation device is a moving magnet electromagnetic actuator.

2. The test bench according to claim 1, wherein:
- wherein the actuation device comprises:
  - a coil, which extends along the longitudinal axis;
  - a cage, disposed radially to the longitudinal axis (A10) around the coil, translationally guided with respect to the coil parallel to the longitudinal axis and rigidly connected to the output shaft; and
  - permanent magnets, borne by the cage and arranged around the coil;
- and wherein the cage is configured to be translationally moved with respect to the coil along the longitudinal axis when the coil is energized by an electrical power signal.

3. The test bench according to claim 2, further comprising a control device, the control device comprising:
- an analogue module with an input and an output, the input being configured to receive control instructions sent by a computer, while the output is configured to deliver an analogue control signal for controlling the actuation device as a function of the control instructions; and
- a control board, comprising a first input, connected to the output of the analogue module, a second input, connected to an electrical power source, and a power output, connected to the coil;
- wherein the control board is configured to combine the analogue control signal with the electrical power source in order to deliver the electrical power signal to the coil.

4. The test bench according to claims 1, further comprising:
- a movable stop, mounted on the output shaft; and
- two fixed stops, rigidly connected to the frame and arranged on either side of the movable stop, so as to limit the movements of the output shaft between the front and rear positions.

5. The test bench according to claim 4, wherein the fixed stops are made of elastomer material.

6. Test The test bench according to claim 1, further comprising a position sensor configured to measure a position of an end of the output shaft connected to the actuation rod of each bulb.

7. The test bench according to claim 6 wherein the sensor comprises a laser sensor.

8. The test bench according to claims 1, further comprising a force sensor configured to measure a force exerted by the output shaft on the actuation rod of each bulb.

9. The test bench according to claim 8, wherein the force sensor comprises a piezoelectric sensor.

10. A test assembly, comprising:
- a test bench according to claim 1; and
- at least one bulb;

wherein:

each bulb is fixed to the frame; and the actuation rod of each bulb is connected to the output shaft.

11. A method of using the test bench according to claim 1 for testing one or more contactor bulbs, the use method comprising:

fixing the one or more bulbs to the frame;

connecting the output shaft to the actuation rod of each bulb;

moving the output shaft between its front and rear positions by means of the actuation device as many times as desired, for example, one million times.

12. The method according to claim 11 wherein the output shaft is moved between its front and rear positions one million times.

* * * * *